(12) United States Patent
Suh

(10) Patent No.: US 6,907,558 B2
(45) Date of Patent: Jun. 14, 2005

(54) APPARATUS AND METHOD FOR RECORDING AND REPRODUCING DATA INTO AND FROM OPTICAL DISK USING ZIGZAG SCAN

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 09/899,099

(22) Filed: Jul. 6, 2001

(65) Prior Publication Data

US 2002/0025142 A1 Feb. 28, 2002

(30) Foreign Application Priority Data

Jul. 7, 2000 (KR) ........................................ 2000/38985

(51) Int. Cl.[7] .............................................. H03M 13/00
(52) U.S. Cl. .................... 714/752; 714/52; 375/240.27; 386/124; 386/40
(58) Field of Search ................................ 714/752, 758, 714/52; 375/240.27; 386/40, 124

(56) References Cited

U.S. PATENT DOCUMENTS 5,745,505 A * 4/1998 Yonemitsu et al. ......... 714/755
5,852,469 A * 12/1998 Nagai et al. ............ 375/240.23
6,064,639 A * 5/2000 Sako et al. ............... 369/47.15

OTHER PUBLICATIONS

"Application of Grobner Bases for Decoding Reed–Solomon Codes Used on CDs", I.S. Reed et al., Nov. 1998, IEEE Proceedings Computers and Digital Techniques, vol. 145, Issue 6, pp 369–376.*

* cited by examiner

*Primary Examiner*—Albert Decady
*Assistant Examiner*—John P. Trimmings
(74) *Attorney, Agent, or Firm*—Birch, Stewart, Kolasch & Birch, LLP

(57) ABSTRACT

A method and apparatus are provided for recording and/or reproducing data to and from an optical recording medium. The method includes reading zigzag direction, blocks of data having a predetermined size of byte units arranged in a pre-set number of rows and columns, the blocks including a main data part and an error correction code (ECC) part, the main data part including a data ID part, wherein the blocks are modulated by a predetermined modulation method; rearranging the blocks read in the zigzag direction; and recording the rearranged data on the optical recording medium.

16 Claims, 7 Drawing Sheets

APPARATUS AND METHOD FOR RECORDING AND REPRODUCING DATA INTO AND FROM OPTICAL DISK USING ZIGZAG SCAN

BACKGROUND OF THE INVENTION

1. Field of the Invention

The present invention relates to a method and apparatus for recording and reproducing data onto and from an optical recording medium, and more particularly to a method and apparatus for recording and reproducing data onto and from an optical recording medium using a zigzag scan, wherein data contained in a data sector are scanned in the zigzag manner, the zigzag scanned data are recorded on the optical recording medium and the recorded data are reproduced from the optical recording medium.

2. Description of the Background Art

Recently, an optical recording medium and an optical magnetic recording medium, which are capable of recording a large quantity of information such as video and audio data, have been developed for practical use.

The optical recording mediums are classified into a reproduction-only recording medium such as a compact disk (CD), a CD-Read Only Memory (CD-ROM) and a digital versatile disk-ROM (DVD-ROM); a WORM (Write Once Read Memory) type recording medium such as a CD-R (CD-Recordable) and a DVD-R (DVD-Recordable); and a rewritable recording medium such as a CD-RW (CD-Rewritable) and a DVD-RAM (DVD-Random Access Memory).

Data is recorded in a different format according to the type of the optical recording medium. For example, a data format recorded in the recordable optical recording medium such as the DVD-RAM will now be described.

In order to record data on the recordable optical recording medium, a user data is processed as a data sector, a record sector and a physical sector.

The data sector having the size of 2064 byte includes a main data part in which 2048 byte data is recorded and a 16 byte ID record part in which sector information or the like is recorded. The user data is recorded in the main data part.

The record sector is generated as the data recorded in the main data part is scrambled and an error correction code is added.

The physical sector is generated as the record sector is modulated in an eight to fourteen modulation (EFM) plus method and a synchronous signal is added to the modulated data.

In the EFM plus method, the current 8 bit data is modulated to a 16 bit data according to a previous state. Accordingly, the data of the physical sector generated finally after the user data is processed according to the above-described method is recorded in the recordable optical recording medium. This will now be described in more detail.

FIG. 1 is a drawing illustrating the construction of a data sector in accordance with a conventional art.

As shown in FIG. 1, the data sector includes 12 rows of a main data part, and an ID record part consisting of 12 bytes at the starting portion of the first row of the main data part and 4 bytes at the ending portion of the $12^{th}$ row of the main data part.

Each row of the main data part includes 172 bytes. Since the first row includes the 12 byte ID record part, the main data part is 160 byte, and since the $12^{th}$ row includes the 4 byte ID record part, the main data part is 168 byte.

A 4 byte data ID (Identification), a 2 byte IDE (ID Error detection code), a 6 byte RSV (Reverse) and a 4 byte EDC (Error Detection Code) are recorded in the ID record part.

Information such as the sector number, a sector layer or area is recorded in the data ID. A parity bit for detecting an error in the data ID is recorded in the IDE. Information such as copy prevention information is recorded in the RSV. A parity bit for detecting an error of the whole sector is recorded in the EDC.

The user data is recorded in the 2048 byte main data. The record sector with the above described structure is generated as the data is scrambled and an error correction code is added thereto.

FIG. 2 is a drawing illustrating a record sector in accordance with the conventional art. As shown in FIG. 2, the record sector has 13 rows and each row has 182 bytes. An error correction code (ECC) is inserted for the 10 byte of the end portion of each row. Accordingly, the record sector is modulated, for example, using an EFM plus method, and when a synchronous signal is added to the modulated data, a physical sector as shown in FIG. 3 is generated.

FIG. 3 is a drawing illustrating a physical sector in accordance with the conventional art.

As shown in FIG. 3, the physical sector has 13 rows and each row has 2976 bytes. The physical sector is generated as the record sector is modulated by the EFM plus method and a 4 byte synchronous signal (SY) is added for every 1456 byte of the modulated data.

The EFM plus modulation is performed to reduce a high frequency component of a record pulse and to restrain a DC component.

The 4 byte synchronous signal (SY) is inserted for every 182 byte of the EFM plus modulated data. Thus, two synchronous signals (SY) are inserted in each row consisting of 372 bytes.

The data of the generated physical sector is NRZI (Non Return to Zero Inversion) converted and sequentially recorded in the recordable optical recording medium, as indicated in a dotted row.

FIG. 4 is a drawing illustrating an apparatus of recording and reproducing data to and from the optical recording medium in accordance with the conventional art.

As shown in FIG. 4, the apparatus for recording and reproducing data to and from the optical recording medium includes a scramble and ECC adding unit 4 receiving a data sector, scrambling it, adding an error correction signal and generating a record sector, a modulator 6 receiving the record sector and EFM-plus-modulating the record sector, a synchronous signal inserting unit 8 receiving the EFM plus modulated data, inserting a synchronous signal thereto and generating a physical sector, and a recording unit 12 receiving the physical sector from the synchronous signal inserting unit 8 and recording it on an optical recording medium.

The operation of the apparatus of FIG. 4 will now be explained.

In a recording mode:

When an image data as a main data and a data sector containing an ID record part of a data desired to be recorded in an optical recording medium are inputted to the scramble and ECC adding unit 4, the scramble and ECC adding unit 4 scrambles the inputted data sector, inserts an error correction code thereto and generates a record sector.

When the record data is inputted from the scramble and ECC adding unit 4 to the modulator 6, the modulator 6 performs the EFM plus process on the record sector.

When the EFM plus modulated data is inputted from the modulator 6 to the synchronous signal inserting unit 8, the synchronous signal inserting unit 8 inserts a synchronous signal into the EFM plus modulated data and generates a physical sector.

In a reproducing mode:

The data recorded on the optical recording medium in the recording mode, as discussed above, is reproduced by a reproducing unit.

However, as indicated in a dotted row in FIG. 3, the data of the physical sector is sequentially recorded on the recordable optical recording medium. Thus, as shown in FIG. 5, if there is a scratch 2 in the same direction as the tracks of the optical recording medium, the data recorded on the optical recording medium inevitably contains a bust error when being reproduced (the bust error may be generated when a data recorded on an optical recording medium contaminated with dust or a fingerprint is reproduced).

At this time, an error correction code is inserted in order to correct the error of the data being reproduced. But since it can correct a limited number of errors, failing to correct such a scratch results in the data recorded on the optical recording medium to be reproduced incompletely. That is, the above method and apparatus for recording and reproducing data to and from the optical recording medium have a problem that the data recorded on the optical recording medium having scratches formed in the same direction as the track direction will have errors or will be incompletely reproduced.

SUMMARY OF THE INVENTION

Therefore, an object of the present invention is to provide a method and apparatus for recording and/or reproducing data to and from an optical recording medium using a zigzag scan, which are capable of recording data to an optical recording medium without a bust error and of reproducing the recorded data completely from the optical recording medium.

Yet another object of the present invention is to provide a method and apparatus for recording and reproducing data to and from an optical recording medium using a zigzag scan, which are capable of recording data to the optical recording medium and reproducing the recorded data by using a zigzag scan.

To achieve these and other advantages and in accordance with the purpose of the present invention, as embodied and broadly described herein, there is provided a method for recording and/or reproducing data to and from an optical recording medium, including the steps of: reading blocks having a predetermined size of byte units arranged in a pre-set number of rows and columns in an optical recording medium and rearranging the read blocks; recording the rearranged data on the optical recording medium; reading the data recorded on the optical recording medium; and reproducing the read data.

To achieve the above objects, there is further provided an apparatus for recording and/or reproducing data to and from an optical recording medium using a zigzag scan, including: a data processor for processing user data to generate data recordable on an optical recording medium, and processing the data read from the optical recording medium to generate original user data; a rearranging unit for rearranging the data outputted from the data processor to generate rearranged data, or processing the rearranged data to generate data before being rearranged; and a recording unit for recording the data outputted from the rearranging unit on the optical recording medium.

To achieve the above objects, there is further provided a method for recording data to an optical recording medium in which data to be recorded on a recordable optical recording medium is modulated and a synchronous signal is inserted into the modulated data. The method includes the steps of: scanning data in a zigzag manner so that the data with the synchronous inserted into the data can be dispersed in a track traverse direction of the optical recording medium; and recording the zigzag-scanned data on the optical recording medium.

To achieve the above objects, there is further provided an apparatus for recording data on an optical recording medium using a zigzag scan, including: a scramble/error correction code adding unit scrambling a data sector and adding an error correction code to generate a record sector; a modulator modulating a record sector; a synchronous signal inserting unit inserting a synchronous signal into the modulated data to generate a physical sector; a zigzag scanning unit scanning the physical sector zigzag so as to be dispersed in a track traverse direction of the optical recording medium and rearranging the scanned data; and a recording unit recording the rearranged data on the recordable optical recording medium.

An optical recording medium data reproducing method is provided in which data is recorded to be distributed in a traverse direction of a track in an optical recording mediurr. and is scanned in a zigzag manner, and the recorded data is reproduced. The method includes the steps of: reading data recorded on the optical medium; arranging the read data in the reverse order of the zigzag scan; and reading the reversely arranged data.

An optical recording medium data reproducing method is provided in which data is recorded to be distributed in a traverse direction of a track in an optical recording medium and scanned in a zigzag manner, and the recorded data is reproduced. The method includes a reproducing unit reading data recorded on the optical recording medium; and a scan unit scanning the data read from the reproducing unit in the reverse order of the zigzag scan.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 6:
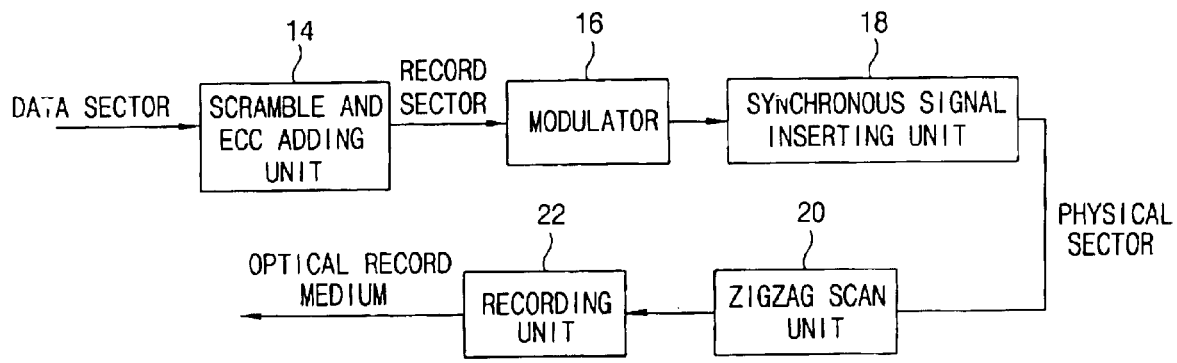
FIG. 6 is a drawing illustrating the construction showing an apparatus for recording and reproducing data to and from an optical recording medium using a zigzag scan in accordance with a preferred embodiment of the present invention.

FIG. 6 is a drawing illustrating the construction showing an apparatus for recording and reproducing data to and from an optical recording medium using a zigzag scan in accordance with a preferred embodiment of the present invention.

As shown in FIG. 6, the apparatus includes a scramble and ECC adding unit 14 for receiving a data sector and generating a record sector; a modulator 16 for receiving the record sector and EFM-plus-modulating it; a synchronous signal inserting unit 18 for receiving the EFM plus modulated data and generating a physical sector; a zigzag scan unit 20 for scanning the physical sector generated from the synchronous signal inserting unit 18 in a zigzag manner, and a recording unit 22 recording the zigzag-scanned data on an optical recording medium.

The operation of the apparatus of FIG. 6 will now be explained.

When a data sector containing an image data as a main data and an ID record portion is inputted to the scramble and ECC adding unit 14, the scramble and ECC adding unit 14 scrambles the inputted data sector and inserts an error correction code (ECC) to the scrambled data sector to generate a record sector.

When the record sector is inputted from the scramble and ECC adding unit 14 to the modulator 16, the modulator 16 EFM-plus-modulates the record sector.

When the EFM plus modulated data is inputted from the modulator 16 to the synchronous signal inserting unit 18, the synchronous signal inserting unit 18 inserts a synchronous signal to the EFM plus modulated data to generate a physical sector.

When the physical sector outputted from the synchronous signal inserting unit 18 is inputted to the zigzag scanning unit 20, the zigzag scanning unit 20 scans the inputted physical sector in a zigzag manner. The data generated as the zigzag scanning unit 20 scans the physical sector is inputted to the recording unit 22. Then, the recording unit 22 sequentially records the zigzag-scanned data onto a recordable optical recording medium.

The zigzag scanning unit 20 scans the physical sector in a zigzag manner and rearranges the data contained in the physical sector. The zigzag scanning by the zigzag scanning unit 20 will now be described in detail.

Figure 7:
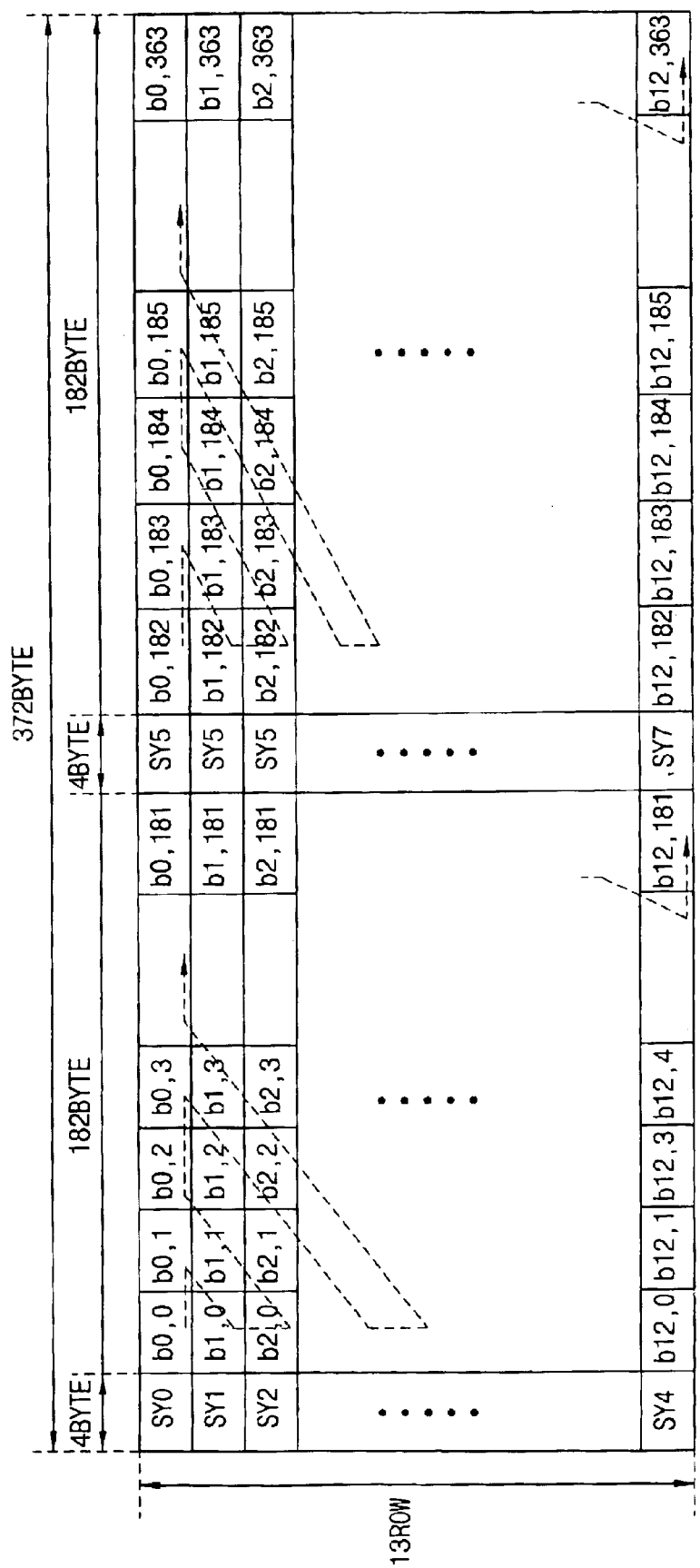
FIG. 7 is a drawing illustrating a physical sector adopting a zigzag scan in explanation for a method for recording and reproducing data to and from an optical recording medium using a zigzag scan in accordance with the preferred embodiment of the present invention.

FIG. 7 is a drawing illustrating a physical sector adopting a zigzag scan to explain the method for recording and reproducing data to and from the optical recording medium using the zigzag scan in accordance with the preferred embodiment of the present invention.

After receiving the physical sector outputted from the synchronous signal inserting unit 18, the zigzag scanning unit 20 scans in a zigzag manner the 13 rows of 364 bytes of the physical sector, except for the two 4 byte synchronous signals (SY) from each row as indicated by the dotted lines.

More specifically, since the two portions of 182 byte size in the physical sector are separated by the synchronous signals (SY), 364 bytes (182 byte X2) of the physical sector are scanned zigzag. That is, 182 byte data at the front portion of the physical sector is scanned zigzag in the order of (b0,0), (b0,1), (b1,0), (b2,0), (b1,1), . . . , (b12,181) as indicated by the dotted arrow. Meanwhile, the 182 byte data at the rear portion of the physical sector is scanned zigzag in the order to (b0,182), (b0,183), (b1,182), (b2,182), (b1,183), . . . , (b12,313) as indicated by the dotted arrow.

Figure 8:
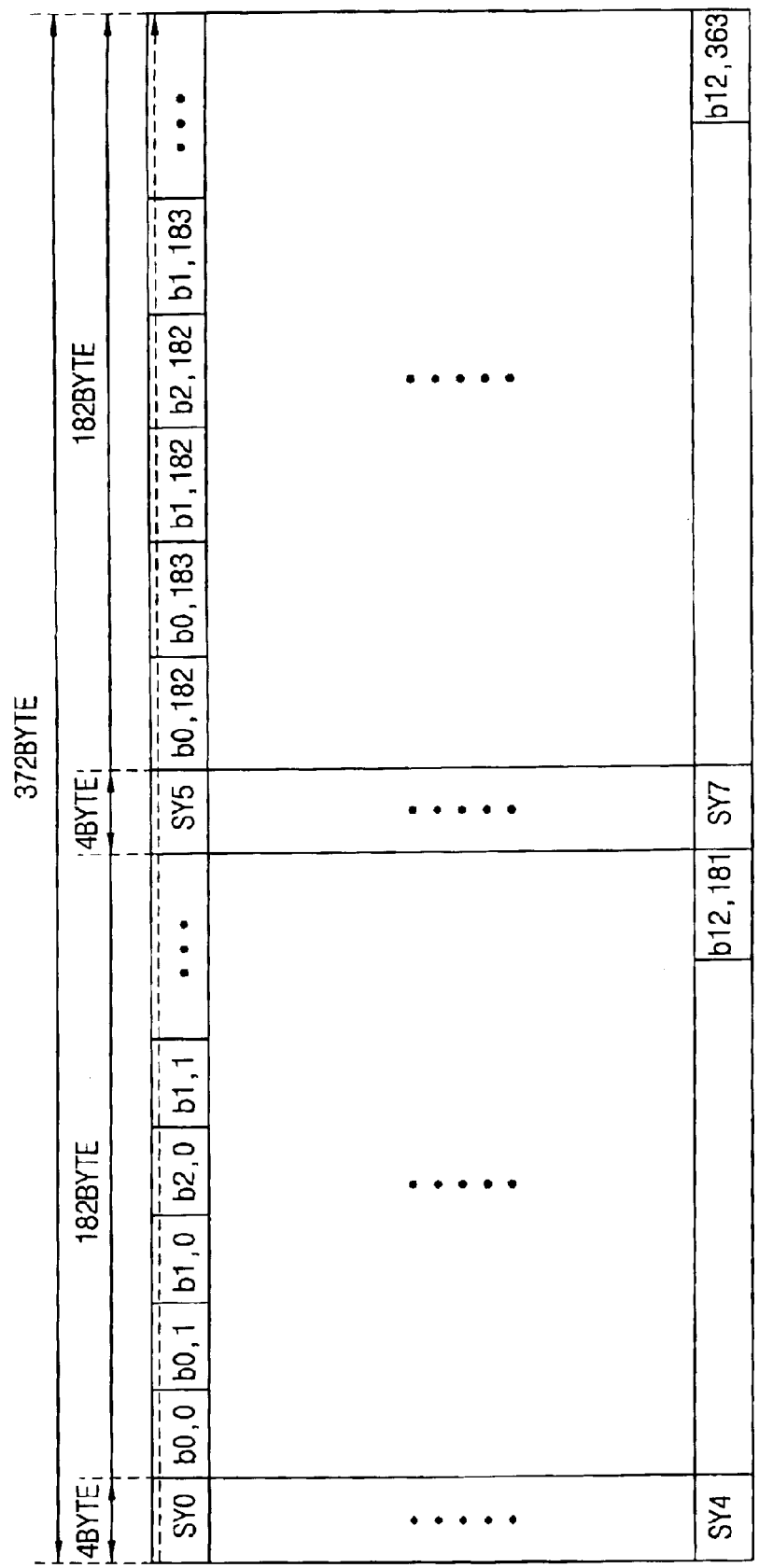
FIG. 8 is a drawing illustrating a rearranged data after zigzag scanning of FIG. 7 in accordance with the preferred embodiment of the present invention.

FIG. 8 is a drawing illustrating the data rearranged as a result of the zigzag scanning of FIG. 7 in accordance with the preferred embodiment of the present invention.

As shown in FIG. 8, in the rearranged data, each row of a 372 byte size includes two synchronous signals (SY) each having 4 byte size, and two 182 byte data parts rearranged by the zigzag scanning.

Accordingly, the data part is rearranged in the order of (b0,0), (b0,1), (b1,0), (b2,0), (b1,1), . . . , (b12,181), (b0, 182), (b0,183), (b1,182), (b2,182), (b1,183), . . . , (b12,313) and sequentially recorded on the recordable optical recording medium.

Figure 1:
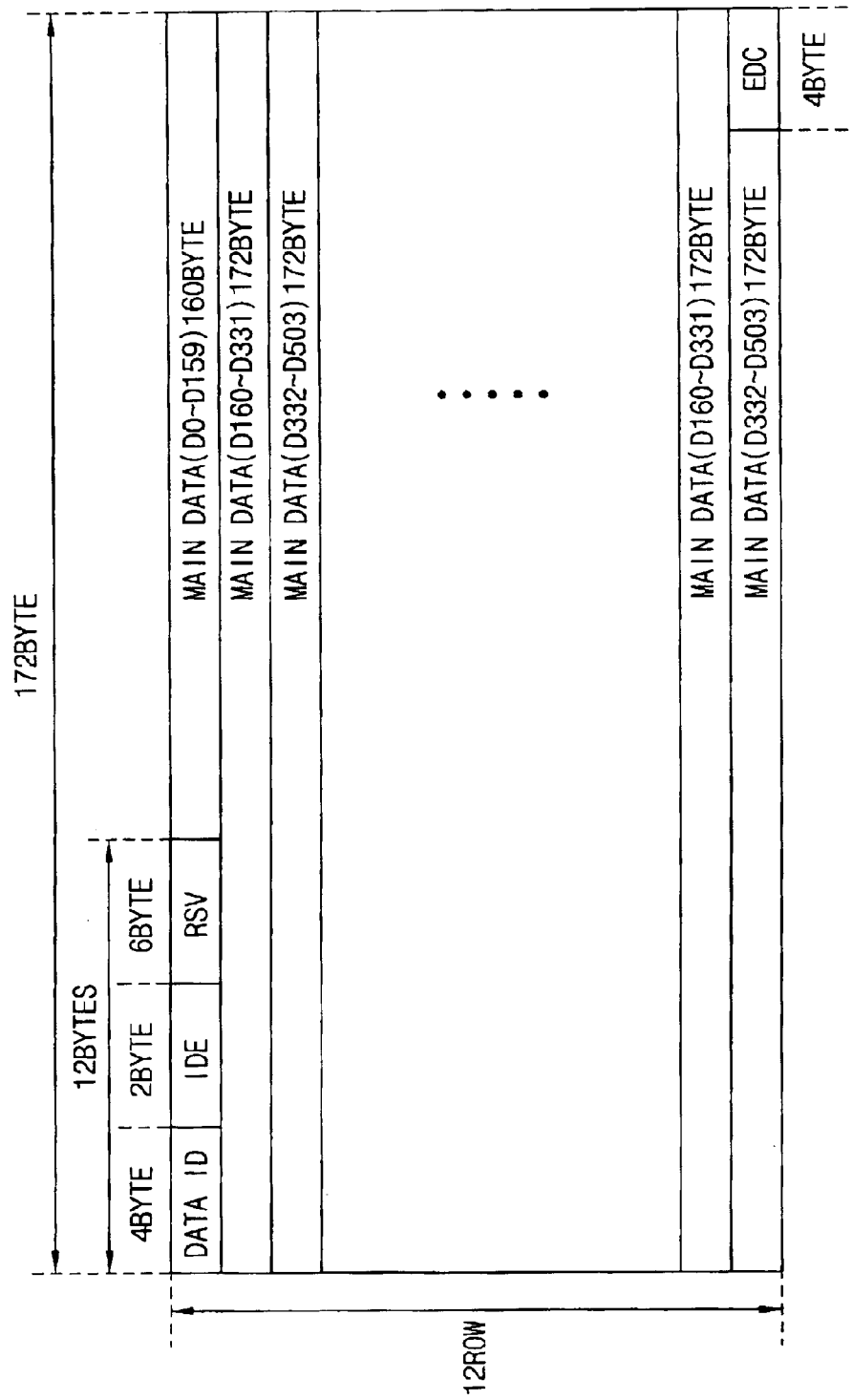
FIG. 1 is a drawing illustrating the structure of a data sector in accordance with a conventional art.
Figure 2:
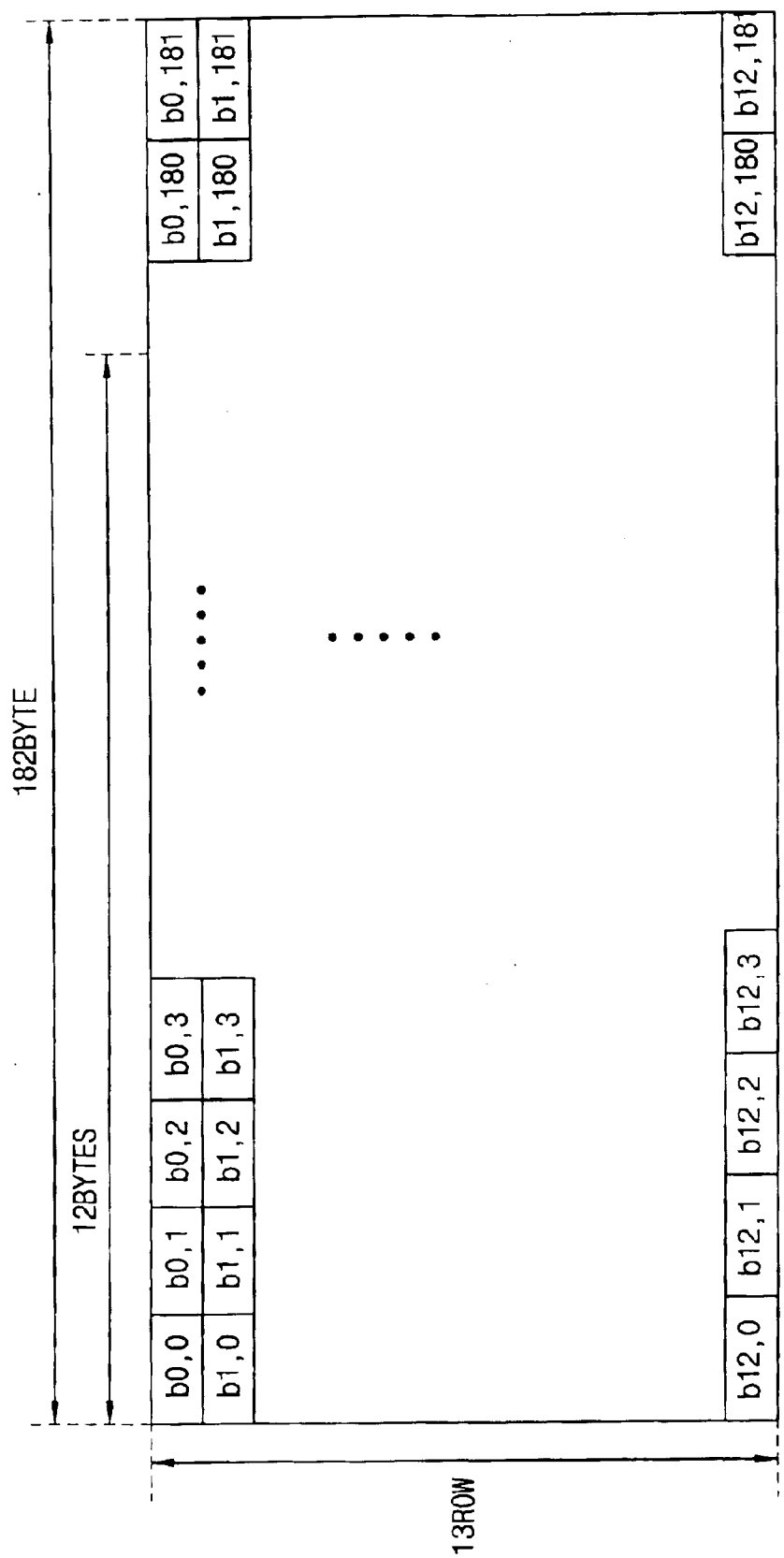
FIG. 2 is a drawing illustrating the structure of a record sector in accordance with the conventional art.
Figure 3:
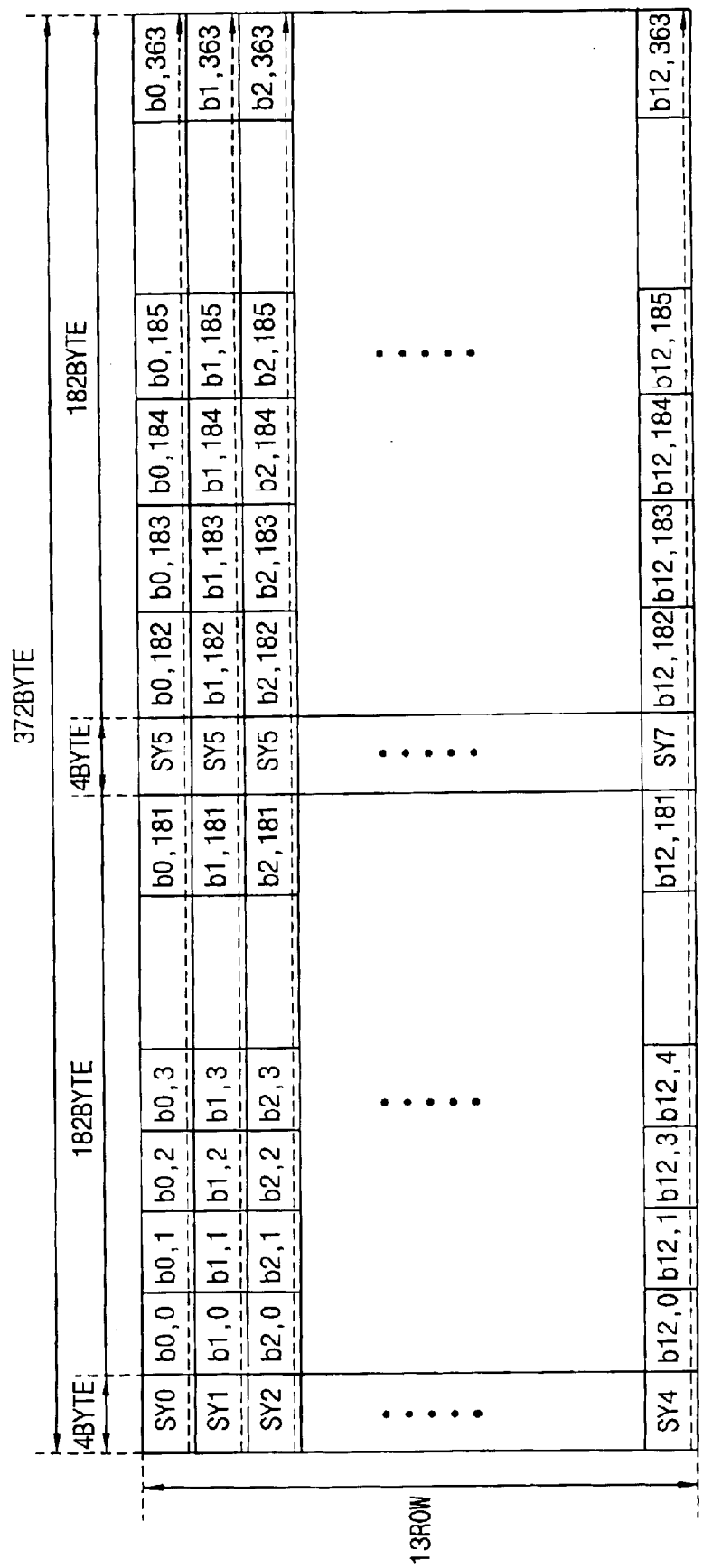
FIG. 3 is a drawing illustrating the structure of a physical sector in accordance with the conventional art.
Figure 4:
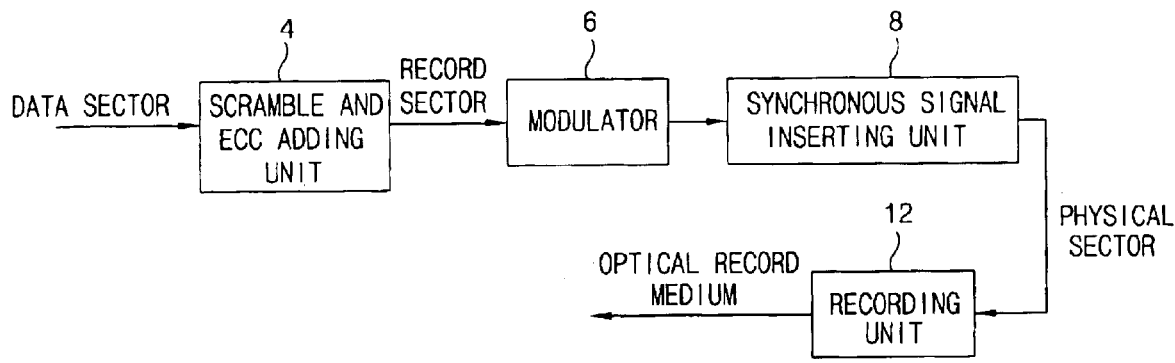
FIG. 4 is a drawing illustrating the construction of an apparatus for recording and reproducing data to and from an optical recording medium in accordance with the conventional art.
Figure 5:
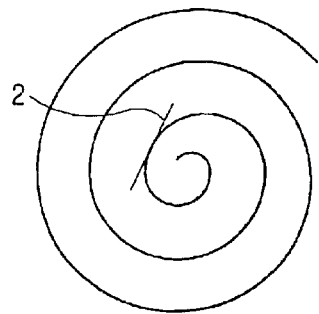
FIG. 5 is a drawing illustrating a scratch produced on the optical recording medium.

Since the data generated after being zigzag scanned is recorded on the optical recording medium, as shown in FIG. 5, even if the scratch 2 occurs in the same direction as the track direction of the optical recording medium, the rearranged physical sector does not contain a sequentially generated error. That is, since the physical sector has been scanned zigzag, an error is distributed in every row of the physical sector. However, such errors are within the coverage that can be corrected by the error correction code, and are thus managed without causing problems or errors during the reproduction operation.

Accordingly, even though there exists a scratch generated in the same direction as the track direction, the data recorded on the optical recording medium can be corrected and reproduced efficiently and successfully.

Figure 9:
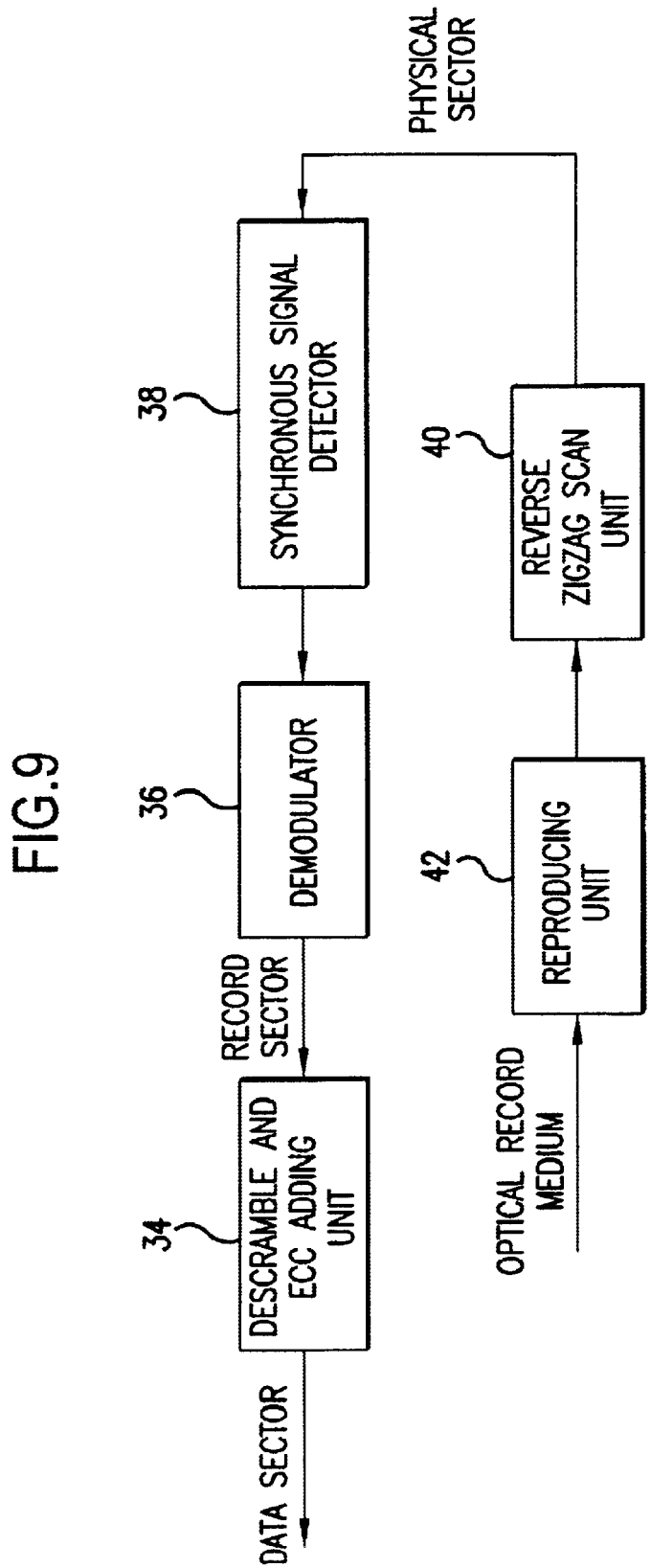
FIG. 9 is a drawing illustrating reproducing parts of the apparatus of FIG. 6 in accordance with the present invention.

Meanwhile, by performing the opposite operation to the recording operation of FIG. 6, the optical recording medium data recording and reproducing apparatus can reproduce the data recorded on the optical recording medium. That is, the data recorded on the optical recording medium is read and arranged in the reverse order of zigzag, so that the original data can be restored. For example, as shown in FIG. 9, a reproducing unit 42 for reading data from the optical recording medium, a reverse zigzag scan unit 40, a synchronous signal detector 38, a demodulator 36 and a descramble and ECC detector 34 are further provided.

As so far described, the method and apparatus for recording and reproducing data to and from the optical recording medium using a zigzag scan have the following advantage.

The data of the physical sector is scanned zigzag, an accordingly generated data is rearranged, and the rearranged data is recorded on the optical recording medium, so that the recorded data can be reproduced without an error regardless of the errors generated in the same direction as the track direction of the optical recording medium.

In the preferred embodiments of the present invention, though the method and apparatus for recording and reproducing data to and from the optical recording medium including the zigzag scanning unit are implemented, the zigzag scanning unit can be easily and separately added to the optical recording medium data recording and reproducing apparatus of the conventional art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for recording or reproducing data or from an optical recording medium, comprising the steps of:

reading, in a zigzag direction, blocks of data having a predetermined size of byte units arranged in a pre-set number of rows and columns, the blocks including a main data part and an error correction code (ECC) part, the main data part including a data ID part, wherein the blocks are modulated by a predetermined modulation method;

rearranging the blocks read in the zigzag direction; and recording the rearranged data on the optical recording medium.

2. The method of claim 1 wherein, in the rearranging step, columns and rows of the blocks are scanned zigzag in a diagonal direction and the resulting blocks are rearranged in a row.

3. The method of claim 1, wherein the data to be recorded contains a synchronous signal.

4. The method of claim 3, wherein the synchronous signal is excluded from being read in the zigzag direction.

5. The method of claim 1, wherein the modulated data is formed by an EFM plus modulation method, wherein 8-bit data is modulated to 16-bit data.

6. The method of claim 5, wherein the modulated data contains scrambled main data and data ID.

7. An apparatus for recording or reproducing data to or from an optical recording medium using a zigzag scan, comprising:

a data processor generating blocks to be recorded on an optical recording medium from user data, the data blocks having a predetermined size of byte units arranged in a pre-set number of rows and columns, the data blocks including a main data part and an error correction code (ECC) part, the main data part including a data ID part, wherein the data blocks are modulated by a predetermined modulation method, a rearranging unit generating rearranged data from the data outputted from the data processor by scanning the data blocks in a zigzag direction, and a recording unit recording the rearranged data outputted from the rearranging unit on the optical recording medium.

8. The apparatus of claim 7, wherein the data processor comprises:

a scramble and ECC adding unit for scrambling the main data part, inserting the ECC part and generating the data blocks;

a modulator for modulating the data blocks; and a synchronous signal inserting unit for inserting a synchronous signal into the modulated data and generating the data blocks to be recorded on the optical recording medium.

9. The apparatus of claim 7, wherein the rearranging units scans the data outputted from the data processor in a zigzag diagonal direction.

10. A method for recording data to an optical recording medium in which data to be recorded on an optical recording medium includes a plurality of data blocks, the data blocks having a predetermined size of byte units arranged in a pre-set number of rows and columns, the data blocks including a main data part and an error correction code (ECC) part, the main data part including a data ID part, wherein the data blocks are modulated by a predetermined modulation method and a synchronous data is inserted into the modulated data blocks, comprising the steps of:

scanning the data blocks in a zigzag direction so that the data blocks can be dispersed in a track traverse direction of the optical recording medium; and recording the zigzag-scanned data and the synchronous data on the optical recording medium.

11. The method of claim 10, wherein in the recording step, the zigzag-scanned data is sequentially recorded on the optical recording medium.

12. A method for reproducing data from an optical recording medium, the data including a plurality of data blocks having a predetermined size of byte units arranged in a pre-set number of rows and columns, the data blocks including a main data part and an error correction code (ECC) part, the main data part including a data ID part, wherein the data as recorded on the optical recording medium is arranged as a result of zigzag scanning the data blocks, and is distributed in a traverse direction of a track in the an optical recording medium , comprising the steps of:

reading the data recorded on the optical recording medium;

arranging the read data in the reverse order of the zigzag scanning; and processing the reversely arranged data.

13. An apparatus for reproducing data from an optical recording medium, the data including a plurality of data blocks having a predetermined size of byte units arranged in a pre-set number of rows and columns, the data blocks including a main data part and an error correction code (ECC) part, the main data part including a data ID part, wherein the data as recorded on the optical recording medium is arranged as a result of zigzag scanning the data blocks and is dispersed in a traverse direction of a track in the optical recording medium, comprising:

a reproducing unit reading the data recorded on the optical recording medium; and a scan unit scanning the data read from the reproducing unit in the reverse order of the zigzag scanning.

14. The method of claim 12, wherein the arranging step includes scanning the read data in the reverse order of a zigzag diagonal scanning.

15. The method of claim 14, wherein the processing step includes demodulating and descrambling the reversely arranged data.

16. The apparatus of claim 13, further comprising:

a synchronous signal detector detecting a signal output from the scan unit;

a demodulator demodulating a signal output from the synchronous signal detector; and a descrambler descrambling a signal output from the demodulator.

* * * * *